V. HENSLEY.
PNEUMATIC TIRE.
APPLICATION FILED AUG. 23, 1916.
1,229,264.
Patented June 12, 1917.
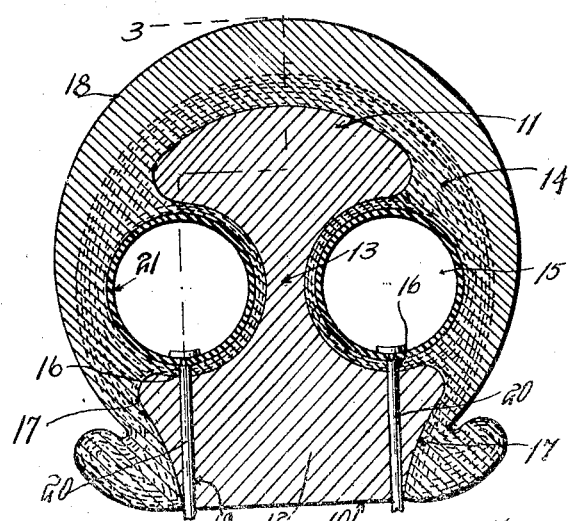
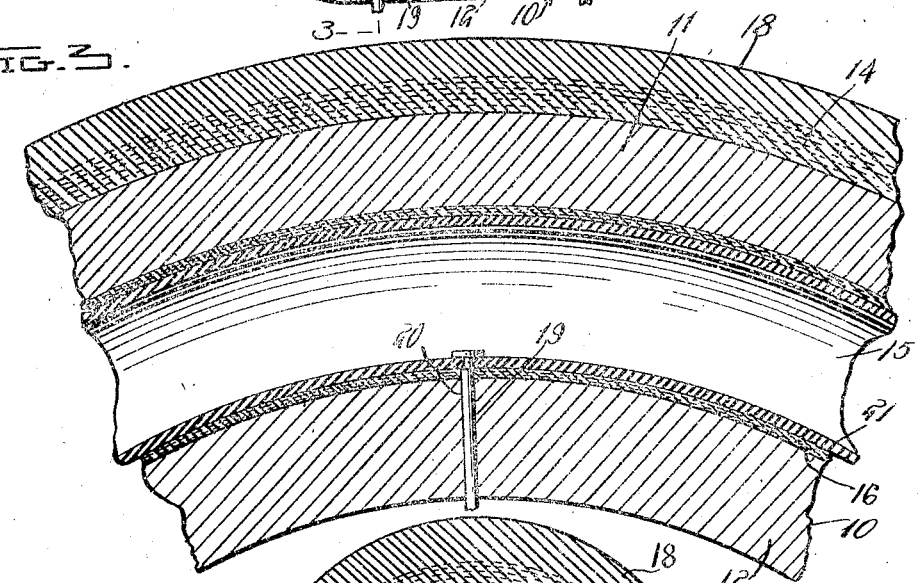
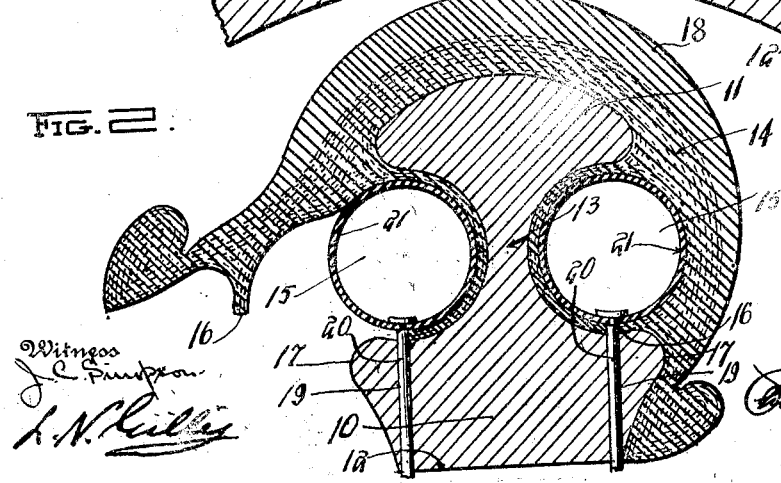
Inventor
V. Hensley

UNITED STATES PATENT OFFICE.

VERGIL HENSLEY, OF VALLEJO, CALIFORNIA.

PNEUMATIC TIRE.

1,229,264.

Specification of Letters Patent.    Patented June 12, 1917.

Application filed August 23, 1916. Serial No. 116,466.

*To all whom it may concern:*

Be it known that I, VERGIL HENSLEY, a citizen of the United States, residing at Vallejo, in the county of Solano, State of California, have invented certain new and useful Improvements in Pneumatic Tires; and I do hereby declare the following to be a full, clear, and exact description of the invention, such as will enable others skilled in the art to which it appertains to make and use the same.

This invention relates to pneumatic tires for vehicles, such as automobiles or the like and has special reference to a tire of this description having a plurality of inflatable tubes therein.

One important object of the invention is to provide an improved and simplified tire of this character which may be used with heavy trucks and lorries and the like, and which, while affording the necessary resiliency, will still be sufficiently wide to furnish the proper support for wheels with broad fellies.

Another important object of the invention is to provide a pneumatic tire having a plurality of removable and replaceable inflatable inner tubes.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a transverse section through a tire constructed in accordance with this invention, the inner tubes being shown in place and the tire in the shape it assumes when in use.

Fig. 2 is a similar view showing one of the side flaps lifted or flexed away from the remainder of the tire so as to permit the withdrawal of the inner tubes.

Fig. 3 is a section on the line 3—3 of Fig. 1.

In carrying out the objects of this invention there is provided a body or core 10 having a tread portion 11 and a rim portion 12 connected by a web 13. This web 13 has concaved sides so that there are formed a pair of oppositely directed troughs on each side of the core. This core is preferably made of some rubber composition. Covering this core is a reinforcing section or member 14 which is connected to the portions 11 and 13 of the core, this reinforcing member being provided on each side of the web 13, with inner tube receiving chambers 15 which extend peripherally around the tire. Moreover, this portion or section 14 is slit as at 16 and the rim portions are separated and free from the rim portion of the core as indicated at 17. This reinforced portion or section 14 is composed in the usual way of layers of fabric and rubber as shown and is covered on the sides and tread with a rubber tread portion 18. Through the rim portion 12 of the core extends passages 19 wherein are received the stems 20 of the inflation valves of the inner tubes 21 mounted in the inner tube chambers 15. It will be noted that the rim and tread portions of the cores 10 underlie and overlie the chambers 15 respectively so that these chambers are protected at their weakest points. As clearly shown in Fig. 2 the sides of the portions 14 and 18 may be folded or flexed away from the core so as to permit the withdrawal of the inner tubes 21.

By means of this construction the inner tubes may at any time be renewed without making it necessary to renew the entire tire and yet, when the tire is in position on the rim, these inner tubes are held firmly in place by the peculiar shape of the core 10, and rim portions of the covering sections 14.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

A tire consisting of a substantially I-shaped core, the flanges of the I-shaped core forming tread and rim portions connected by the web of the I, a reinforcing cover extending over the tread flanges and then under the tread flanges down along the sides of the web, said cover further extending outward along the flanges of the rim portion of the core, said cover further extending from the tread flanges outwardly and then inwardly to the rim flanges to provide circular apertures between the two portions of the cover, the last-mentioned portion butting against the first-mentioned portion on top of the rim flanges and following the rim flanges to the rim portion of the core, the two portions of the cover being separated along their lines of meeting on the rim flanges, and a tread fixed to the reinforcing portion of the tire.

In testimony whereof, I affix my signature, in the presence of two witnesses.

VERGIL HENSLEY.

Witnesses:
  C. O. HUNT,
  C. L. ANDERSON.